US010366001B1

(12) United States Patent
Guggilla et al.

(10) Patent No.: US 10,366,001 B1
(45) Date of Patent: Jul. 30, 2019

(54) PARTITIONING MEMORY BLOCKS FOR REDUCING DYNAMIC POWER CONSUMPTION

(71) Applicant: Xilinx, Inc., San Jose, CA (US)

(72) Inventors: Nithin Kumar Guggilla, Hyderabad (IN); Chaithanya Dudha, San Jose, CA (US); Krishna Garlapati, Los Gatos, CA (US); Chun Zhang, San Jose, CA (US); Fan Zhang, San Jose, CA (US); Anup Kumar Sultania, Livingston, AL (US)

(73) Assignee: XILINX, INC., San Jose, CA (US)

( * ) Notice: Subject to any disclaimer, the term of this patent is extended or adjusted under 35 U.S.C. 154(b) by 11 days.

(21) Appl. No.: 15/706,255

(22) Filed: Sep. 15, 2017

(51) Int. Cl.
*G06F 12/00* (2006.01)
*G06F 12/02* (2006.01)
*G06F 1/3287* (2019.01)
*G06F 13/00* (2006.01)
*G06F 13/28* (2006.01)

(52) U.S. Cl.
CPC ........ *G06F 12/0238* (2013.01); *G06F 1/3287* (2013.01); *G06F 2212/202* (2013.01)

(58) Field of Classification Search
CPC ............... G06F 12/0238; G06F 1/3287; G06F 2212/202
See application file for complete search history.

(56) References Cited

U.S. PATENT DOCUMENTS

| | | | | |
|---|---|---|---|---|
| 5,663,905 A * | 9/1997 | Matsuo | ................. | G11C 11/005 257/E27.081 |
| 5,943,681 A * | 8/1999 | Ooishi | ................. | G06F 12/0804 711/105 |
| 6,150,838 A * | 11/2000 | Wittig | ................. | H03K 19/1737 326/38 |
| 7,412,369 B1 * | 8/2008 | Gupta | ................. | G06F 11/3457 703/1 |
| 8,493,397 B1 * | 7/2013 | Su | ............... | G06F 3/14 345/530 |
| 8,645,730 B2 * | 2/2014 | Jain | ........................ | G06F 1/3268 713/320 |
| 2005/0210206 A1* | 9/2005 | Woodbridge | ....... | G06F 12/0215 711/154 |
| 2007/0153584 A1* | 7/2007 | Mohammad | ........... | G11C 5/147 365/185.23 |
| 2007/0260818 A1* | 11/2007 | Damaraju | ........... | G06F 12/0864 711/128 |

OTHER PUBLICATIONS

Xilinx, Inc., "Distributed Memory Generator", v8.0, LogiCORE IP, Vivado Design Suite, Product Guide, PG063, Nov. 18, 2015, pp. 1-36, San Jose, CA USA.
Xilinx, Inc., "7 Series FPGAs Memory Resources", User Guide, PG473, Sep. 27, 2016, pp. 1-86, San Jose, CA USA.

* cited by examiner

Primary Examiner — Mark A Giardino, Jr.
(74) Attorney, Agent, or Firm — LeRoy D. Maunu

(57) ABSTRACT

Disclosed approaches of processing a circuit design include determining a subset of addresses of a first RAM of the circuit design that are accessed more often than a frequency threshold. A specification of a second RAM is created for the subset of addresses. A decoder circuit is added to the circuit design. The decoder circuit is configured to enable the second RAM and disable the first RAM in response to an input address in the subset of addresses, and to enable the first RAM and disable the second RAM in response to an input address other than addresses in the subset of addresses.

15 Claims, 5 Drawing Sheets

PARTITIONING MEMORY BLOCKS FOR REDUCING DYNAMIC POWER CONSUMPTION

TECHNICAL FIELD

The disclosure generally relates to reducing dynamic power consumption in integrated circuit designs.

BACKGROUND

RAMs can be among the top consumers of dynamic power in some integrated circuit (IC) applications. The dynamic power consumption of an IC is a function of the power consumed when the circuit changes state and the power used to charge the load capacitance when the circuit changes logic states. Thus, a reduction in switching activity can provide a corresponding reduction in dynamic power consumption.

Optimizing dynamic power consumption often employs gating the clock signal to seldom used parts of an integrated circuit. Clock gating functions on the assumption that for some number of clock cycles the clock-gated circuitry is not needed. However, gating the clock signal to a RAM may be ineffective. For RAMs, clock gating can be ineffective because the application logic accesses different parts of the RAM at different times.

SUMMARY

A disclosed method of processing a circuit design includes determining by a programmed computer system from a representation of the circuit design in a memory of the computer system, a subset of addresses of a first RAM of the circuit design that are accessed more often than a frequency threshold. The computer system creates in the representation of the circuit design, a specification of second RAM for the subset of addresses. The computer system also creates in the representation of the circuit design, a specification of a decoder circuit. The decoder circuit is configured to enable the second RAM and disable the first RAM in response to an input address in the subset of addresses, and to enable the first RAM and disable the second RAM in response to an input address other than addresses in the subset of addresses.

A disclosed circuit arrangement includes a first RAM, a second RAM having a smaller address space than the first RAM, and a decoder circuit coupled to the first RAM and to the second RAM. The decoder circuit is configured to receive an input address, enable the second RAM and disable the first RAM in response to the input address being in a subset of addresses of the first RAM, and enable the first RAM and disable the second RAM in response to an input address other than addresses in the subset of addresses.

A system for processing a circuit design includes one or more processor circuits and a memory arrangement coupled to the one or more processor circuits. The memory arrangement is configured with instructions that when executed by the one or more processor circuits cause the one or more processor circuits to determine from a representation of the circuit design in the memory arrangement, a subset of addresses of a first RAM of the circuit design that are accessed more often than a frequency threshold. The instructions further cause the one or more processor circuits to create a specification of second RAM for the subset of addresses and to create a specification of a decoder circuit. The decoder circuit is configured to enable the second RAM and disable the first RAM in response to an input address in the subset of addresses. The decoder circuit is further configured to enable the first RAM and disable the second RAM in response to an input address other than addresses in the subset of addresses.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

Figure 1:
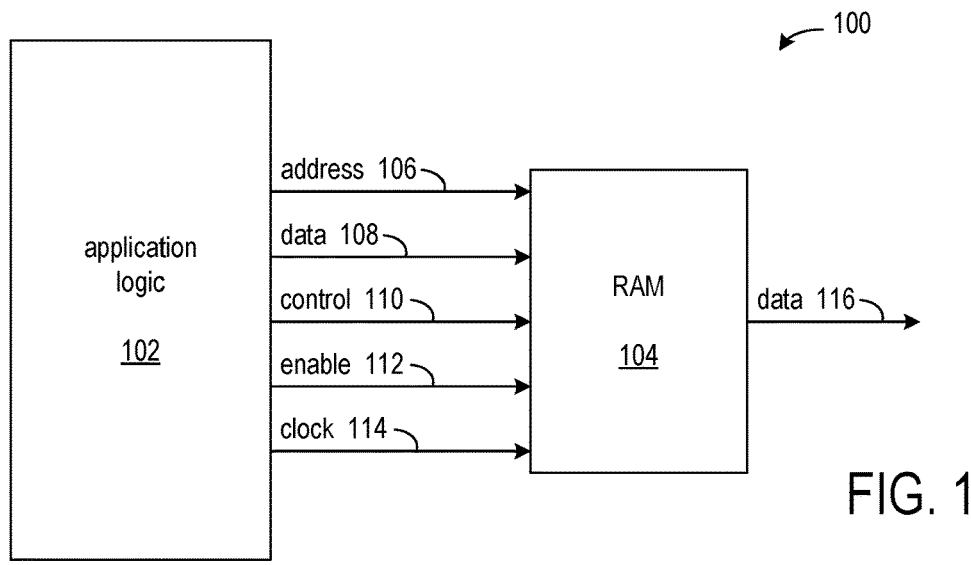
FIG. 1 shows an exemplary circuit design, or a portion thereof, that includes application logic circuitry that accesses a RAM.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Dynamic power consumption can be reduced by partitioning a larger RAM of a circuit design into two RAMs, such that one smaller RAM is used for frequently accessed addresses, and the original larger RAM is used for less frequently accessed addresses. While the smaller RAM is servicing frequently accessed addresses, the original larger RAM can be disabled, which reduces switching activity. The smaller RAM that services the frequently accessed addresses experiences less switching activity than would the original larger RAM in the original design in servicing the frequently accessed addresses.

The disclosed approaches describe methods and systems for processing a circuit design in order to reduce dynamic power consumption of the implemented circuit. A computer system can be programmed with a circuit design tool that processes a circuit design having one or more blocks of RAM. The circuit design tool can implement logic synthesis, optimization, place-and-route, mapping, and configuration bitstream generation processes, for example. As part of logic optimization, the circuit design tool can apply various analysis techniques to determine a subset of addresses that is frequently accessed in each of the blocks of RAM. For each identified subset of addresses, the circuit design tool modifies the circuit design to include a decoder circuit, the original RAM, and a supplemental RAM, which has a smaller address space than the original RAM, to accommodate the subset of addresses. The decoder circuit controls enabling and disabling the original RAM and the supplemental RAM based on an input address. The decoder circuit enables the supplemental RAM and disables the original RAM in response to an input address that is in the subset of addresses determined to be frequently accessed. The decoder circuit enables the original RAM and disables the supplemental RAM in response to an input address other than addresses in the subset of addresses. Switching activity in the original RAM can be greatly reduced by disabling the original RAM when the frequently accessed addresses are accessed.

FIG. 1 shows an exemplary circuit design 100, or a portion thereof, that includes application logic circuitry 102 that accesses a RAM 104. The application logic can include a variety of individual logic circuits (not shown) that generate addresses to the RAM. For example, a counter can output a sequence of addresses, and finite state machines (FSMs) can generate addresses.

The application logic provides address 106, data 108, control 110, enable 112, and clock 114 signals to the RAM. The control signal 110 indicates a read or a write access, and the data signal 108 conveys data bits for write accesses. The RAM outputs data 116 on read accesses. The RAM 104 has an address-decode circuit (not shown) that decodes an input address 106, and the decoding is enabled or disabled in response to the state of the enable signal 112.

The size of the address decoding circuitry in the RAM 104 is proportional to the size of the address space of the RAM, and the full decoding circuitry is exercised for each input address. Thus, the dynamic power consumption of the address decoding circuitry is proportional to the size of the address space of the RAM 104. As the application logic 102 may frequently access some relatively small subset of addresses of the RAM 104 and only infrequently access other addresses in the RAM, the dynamic power consumption is greater than is needed for servicing the small subset of addresses. The address space of the RAM 104 can be partitioned between the RAM 104 and a supplemental RAM 202 as shown in FIG. 2.

Figure 2:
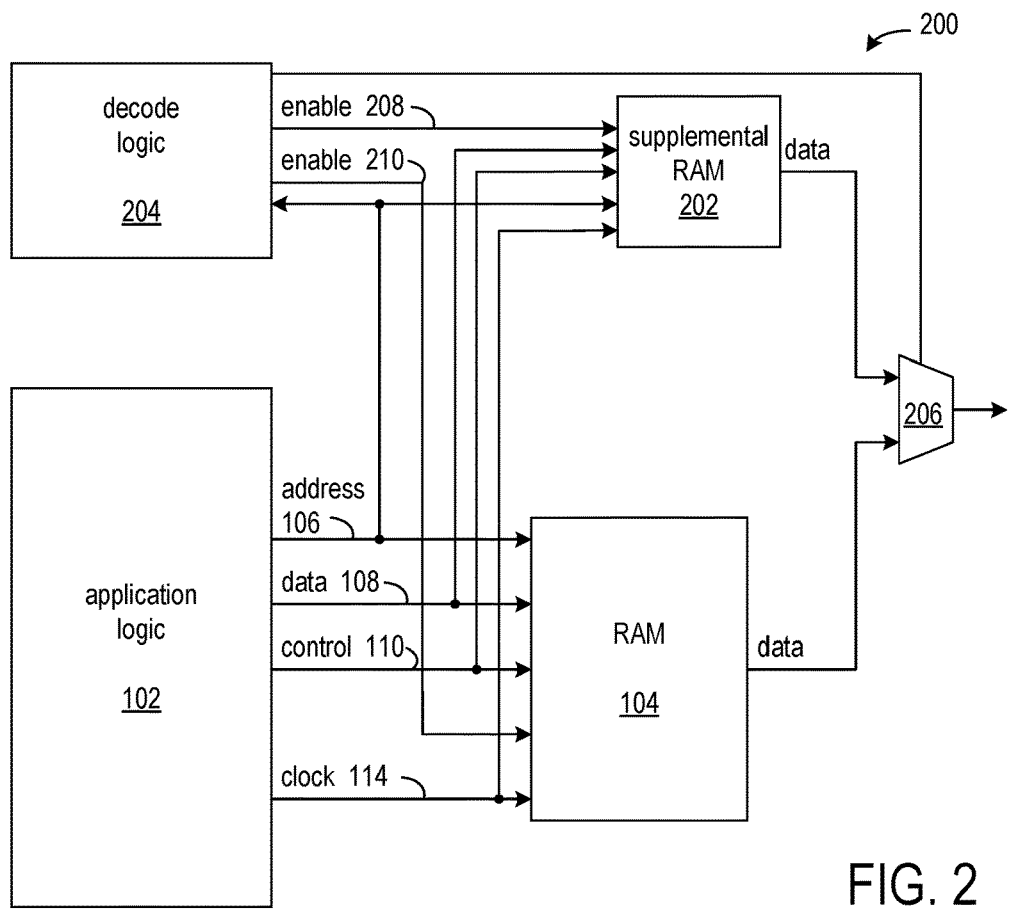
FIG. 2 shows the circuit design of FIG. 1, optimized as a modified circuit design to include a supplemental RAM and decoding logic circuitry for controlling enabling and disabling the original RAM and the supplemental RAM.

FIG. 2 shows the circuit design 100 of FIG. 1, optimized as modified circuit design 200 to include a supplemental RAM 202 and decoding logic circuitry 204 for controlling enabling and disabling the original RAM 104 and the supplemental RAM 202. The decode logic 204 effectively partitions the address space of RAM 104 between the RAM 104 and the supplemental RAM 202. Storage for the data of the subset of addresses of RAM 104 that are frequently accessed is provided by RAM 202, and storage for all other addresses in the address space is provided by RAM 104.

In an exemplary application, the circuit designs 100 and 200 are targeted to a programmable integrated circuit (IC), such the VIRTEX®, KINTEX®, ARTIX®, and ZYNQ® programmable ICs from XILINX®, Inc. In such programmable ICs, the RAM 104 can be a block of RAM ("BRAM") that is dedicated for use as RAM. The RAM 202, in contrast, can be distributed RAM that is constructed from look-up table circuitry in programmable logic of the programmable IC. Such look-up table circuitry is configurable to provide a desired function. For example, look-up table circuitry can be configured to implement a logic function (AND, OR, etc.), a shift register, an arithmetic function, a RAM or any of a variety of other functions as recognized by those skilled in the art. Using look-up table circuitry of the programmable IC permits the size of the supplemental RAM 202 to be tailored to the number of frequently accessed addresses, which is preferably less than the address space of the RAM 104.

The address signal 106, data signal 108, control signal 110, and clock signal 114 are provided from the application logic 102 to both the RAM 104 and the supplemental RAM 202. The address signal 106 is also routed to the decode logic 204. The decode logic determines whether the input address is in the subset of addresses of the RAM 104 that is assigned to the supplemental RAM 202 or is one of the addresses assigned to RAM 104. In an exemplary implementation, the decode logic circuit 204 can be implemented using comparator circuits that compare the input address to each of the frequently accessed addresses.

The decode logic enables one of the RAM 104 or the supplemental RAM 202 and disables the other of the RAM 104 or supplemental RAM 202 based on whether the input address matches one of the addresses assigned to the supplemental RAM 202. The state of enable signal 208 controls enabling and disabling of supplemental RAM 202, and the state of enable signal 210 controls enabling and disabling of RAM 104. In response to the input address matching an address in the subset of addresses assigned to the supplemental RAM 204, the decode logic drives the enable signal 208 to a logic state that enables the supplemental RAM 202 and drives the enable signal 210 to a logic data that disables the RAM 104. In response to the input address not matching an address in the subset of addresses assigned to the supplemental RAM 204, the decode logic drives the enable signal 208 to a logic state that disables the supplemental RAM 202 and drives the enable signal 210 to a logic data that enables the RAM 104. The decode logic circuit controls multiplexer 206 to select data from the enabled one of either RAM 104 or supplemental RAM 202.

Figure 3:
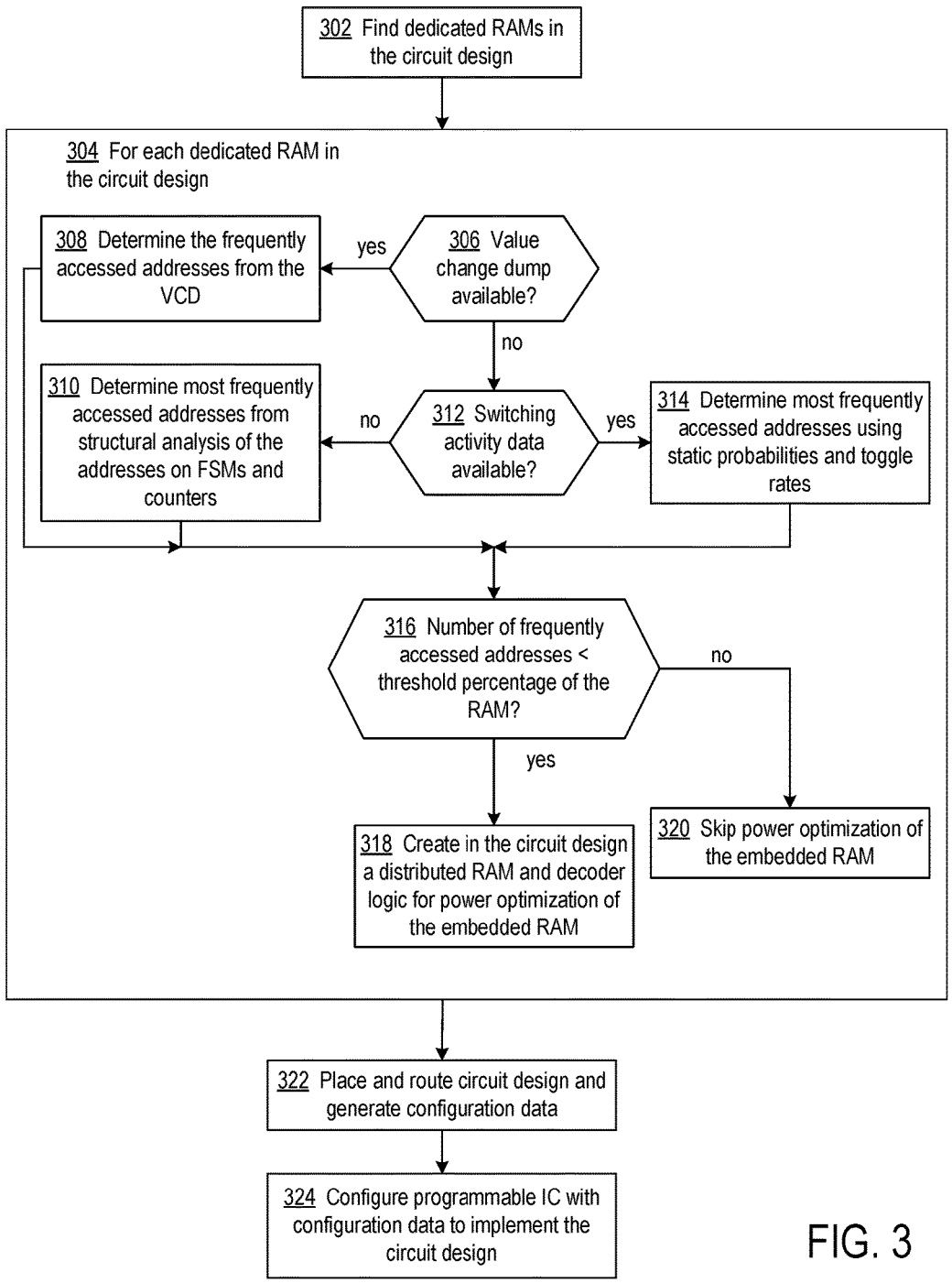
FIG. 3 shows a flowchart of an exemplary process of restructuring a circuit design in order to reduce dynamic power consumed by RAMs in a circuit design.

FIG. 3 shows a flowchart of an exemplary process of restructuring a circuit design in order to reduce dynamic power consumed by RAMs in a circuit design. The process of FIG. 3 can be integrated with a logic optimization phase of a design flow for implementing a circuit design. The design flow can include logic synthesis, logic optimization, logic mapping, place-and-route, and configuration bitstream generation.

At block 302, the process finds the dedicated RAMs in a circuit design. In circuit designs directed to programmable ICs having programmable logic circuitry and RAMs that can only be used as RAMs (e.g., BRAMs), the RAMs of the circuit design implemented on RAMs that can only be used as RAMs (as opposed to RAMs implemented in look-up tables) are dedicated RAMs. For each of the dedicated RAMs in the circuit design, the process performs the operations specified in block 304.

The processing of block 304 generally determines whether or not there is a subset of addresses of the dedicated RAM that are frequently accessed and whether or not that subset of addresses is sufficiently small to merit creation of a supplemental RAM and decode logic circuit. If the foregoing criteria are satisfied, the circuit design tool modifies the circuit design by creating a supplemental RAM and decode logic circuit.

Frequently accessed addresses of the dedicated RAM can be determined from a value change dump (VCD), structural analysis, or switching activity data. At decision block 306, the circuit design tool checks whether or not a value change dump is available. The availability of a VCD can be indicated by a user control input (e.g., a GUI control) or by presence of a VCD file in an expected location. A VCD is generated from simulation of the circuit design and contains data that indicate value changes of signals in the circuit design and the times at which the signals change values.

At block 308, the circuit design tool determines from the VCD, addresses that are frequently accessed. In an example implementation, a threshold number of addresses can be considered to be frequently accessed. As a look-up table (LUT) can be configured to accommodate 64 addresses, two LUTRAMs can be configured to provide storage for 128 addresses. For an address space having 1024 addresses and a threshold of 10% of the address space, the 102 addresses accessed most frequently can be considered frequently accessed and implemented by the supplemental RAM implemented by two LUTRAMs. The threshold can be user configurable parameter, so that based on the application if there is a lesser number of frequently accessed addresses, the threshold can be reduced, or there is a greater number of frequently accessed addresses, the threshold can be increased.

If no VCD is available, decision block 312 determines whether or not switching activity data is available. The availability of switching activity data can be indicated by a user control input (e.g., a GUI control) or by presence of a switching activity interchange format (SAIF) file in an expected location. An SAIF file can be generated from simulation of the circuit design and contains toggle counts and information such as how much time a signal was in a logic 1 state (T1), a logic 0 state (T0), and a logic x state (TX).

Figure 4:
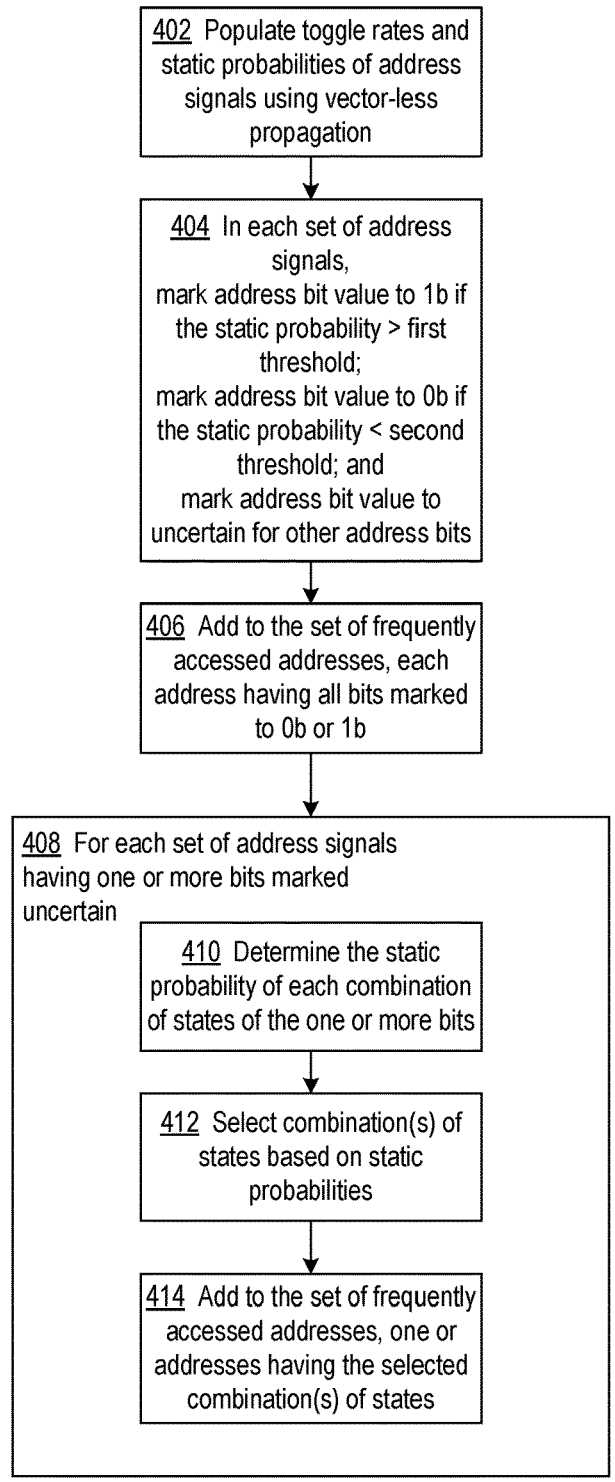
FIG. 4 shows a flowchart of a process of determining frequently accessed addresses using static probabilities of address signals.

At block 314, the circuit design tool uses data in the SAIF file to determine static probabilities, and determine frequently accessed addresses from the static probabilities. The processing of block 314 is shown in FIG. 4.

If no switching activity data is available, at block 310, the circuit design tool determines the most frequently accessed addresses by way of structural analysis of the circuit design. For example, the circuit design tool can identify address signals that are generated by counters and FSMs and derive addresses from characteristics of the counters and FSMs.

In an exemplary implementation, counters and state machines can be identified by examination of a data flow graph generated by a register transfer language (RTL) compiler. For example, a four-bit counter might be limited to counting to 0010 and then resetting to 0000. Addresses 0000 through 0010 would be frequently accessed relative to other address combinations. Another example is the addresses generated by a four-bit shift register, which could generate addresses 0001, 0010, 0100 and 1000, and those addresses would be frequently accessed relative to other address combinations.

For state machines, the information of valid states is known. For example, an 8-bit state machine might only have a few valid states which is only a subset of all combinations, and the valid states can be frequently accessed addresses. Also, a simple heuristic can be used to count the incoming edges of all states and deem the state with the most incoming edges to be the most frequently accessed address.

Once a set of frequently accessed addresses has been determined, the circuit design tool at decision block 316 determines whether the number of frequently accessed addresses is sufficiently few to merit creating a supplemental RAM and decoder logic circuit. If the number of frequently accessed addresses is less than a threshold percentage of the size of the original RAM, the process continues at block 318 to add a supplemental RAM and decoder logic circuit to the circuit design. If the number of frequently accessed addresses is less than the threshold portion of the original RAM, the dynamic power savings provided by enabling the supplemental RAM and disabling the original RAM for the frequently accessed addresses is greater than the dynamic power that would be consumed without the supplemental RAM. In an exemplary implementation, the threshold is 15% of the address space of the original RAM. If the number of frequently accessed addresses is greater than the threshold portion of the original RAM, the process proceeds to block 320 and skips adding a supplemental RAM and decoder logic circuit to the circuit design.

Once all the dedicated RAMs have been processed by the circuit design tool, at block 322, configuration data is generated from the optimized circuit design. For example, place-and-route and bitstream generation tools may be executed to place and route the circuit design and generate configuration data for an FPGA. At block 324, a programmable IC may be configured with the configuration data, thereby creating a circuit that operates according to the circuit design as modified to include the supplemental RAM(s) and decoder logic circuit(s) along with the original RAM(s).

FIG. 4 shows a flowchart of a process of determining frequently accessed addresses using static probabilities of address signals. At block 402, the circuit design tool performs vector-less propagation using toggle counts in the SAIF file to establish toggle rates and static probabilities of address signals. The toggle rate, which can be expressed as a percentage, is the rate at which the output of a synchronous logic element switches compared to a given clock input. The toggle rate can be modeled as a percentage from 0 to 200%. A toggle rate of 100% means that on average the output toggles once during every clock cycle. A toggle rate of 200% implies that the output toggles twice during every clock cycle, changing on both rising and falling clock edges. Static probability defines the percentage of the analysis duration during which the considered element is driven at a high logic level. Static probability can also be referred to as percentage high. For example, if a signal is at logic 1 for 40 ns in a duration of 100 ns, the static probability=40/100=0.4. In vectorless propagation, initial "seeds" are assigned (default signal rates and static probability) to all undefined nodes. Then, starting from the design primary inputs it propagates activity to the output of internal nodes, and repeats this operation until the primary outputs are reached.

At block 404, the circuit design tool assigns address signals values of logic 1, logic 0, or "uncertain" based on the static probabilities of the address signals. Address signals having a static probability greater than a first threshold are assigned logic 1, and address signals having a static probability less than a second threshold are assigned logic 0. Address signals having static probabilities between the first and second thresholds are assigned a value of "uncertain." The first threshold can be 95% and the second threshold 5%, for example. The thresholds may be adjusted according to application and implementation objectives and requirements. At block 406, the circuit design tool adds addresses in which none of the address signals are designated uncertain to the set of frequently accessed addresses. Those addresses having at least one address signal designated as "uncertain," are further processed in block 408.

For address signals that have static probabilities values between the thresholds, the toggle rates and static probabilities are used to determine transition probabilities of the signals. At block 410, the circuit design tool determines the static probability of each combination of states of the one or more address signals marked "uncertain" in an address. Bit transition probabilities are used to determine state transition probabilities in which each state represents a possible combination of bit values of the signals. Then, the static probability of each state is the sum of the transition probabilities of all inbound transitions to that combination. The following example illustrates.

An exemplary address includes 4 address signals: A3, A2, A1, and A0, and exemplary static probabilities of the signals are 0.98, 0.04, 0.25, and 0.5, respectively. The address would initially be assigned "10(A1)(A0)." (A1)(A0) indicate that the signal values for A1 and A0 are "uncertain." Thus, the possible combinations of signal values of signals A1 and A0 are 00b, 01b, 10b, and 11b. The relative static probability of each of these combinations is used to determine whether or not the combination is a frequently accessed address.

The static probability of a combination is determined based on transition probabilities of the signals of the combination (A1 and A0 in the example). The transition probability of a signal transitioning from signal state x to signal state y can be denoted, $T_{xy}$. $T_{00}$, denotes the transition probability of a signal from logic 0 to logic 0, $T_{01}$ denotes the transition probability from logic 0 to logic 1, $T_{11}$ denotes the transition probability from logic 1 to logic 1, and $T_{10}$ denotes the transition probability from logic 1 to logic 0. The transition probability of each signal can be calculated as follows:

$$T_{01}=\alpha=P_{SW}/2(1-P)$$

$$T_{10}=\beta=P_{SW}/2P$$

$$T_{00}=1-\alpha$$

$$T_{11}=1-\beta$$

where P=static probability and $P_{SW}$=toggle rate of the signal. Static probabilities and toggle rates of individual signals are established through vectorless propagation.

Continuing with the previous example, the transition probability from the combination A1A0=00b to A1A0=01b is denoted TP(00→01) and can be computed as $T_{00}$ of A1*$T_{01}$ of A0

The circuit design tool similarly determines:

TP(00→00)

TP(00→10)

TP(00→11)

TP(01→00)

TP(01→01)

TP(01→10)

TP(01→11)

TP(10→00)

TP(10→01)

TP(10→10)

TP(10→11)

TP(11→00)

TP(11→01)

TP(11→10)

TP(11→11)

For each of the combinations 00b, 01b, 10b, and 11b, the circuit design tool calculates the static probability (SP) as a sum of the transition probabilities of inbound transitions to the combination as follows:

SP(00)=TP(00→00)+TP(10→00)+TP(10→00)+TP(11→00)

SP(01)=TP(00→01)+TP(10→01)+TP(10→01)+TP(11→01)

SP(10)=TP(00→10)+TP(10→10)+TP(10→10)+TP(11→10)

SP(11)=TP(00→11)+TP(10→11)+TP(10→11)+TP(11→11)

Once the static probabilities of the combinations have been calculated, at block 412, the circuit design tool evaluates the static probabilities of the combinations of states to determine whether or not the address should be added to the set of frequently accessed addresses. The circuit design tool can use a threshold probability to control whether any addresses are added. Alternatively, the circuit design tool can select the one combination having the greatest static probability or N combinations having the greatest static probabilities. If the static probabilities are all too low, the circuit design tool can optionally not add any address based on the possible combinations to the set of frequently accessed addresses. At block 414, the circuit design tool adds any selected addresses to the set of frequently accessed addresses. For example, in an implementation in which the combination having the greatest static probability is selected, and SP(00)=0.4, SP(01)=0.35, SP(10)=0.73, and SP(11)=0.05, the address 1010 would be selected and added to the set of frequently accessed addresses.

Figure 5:
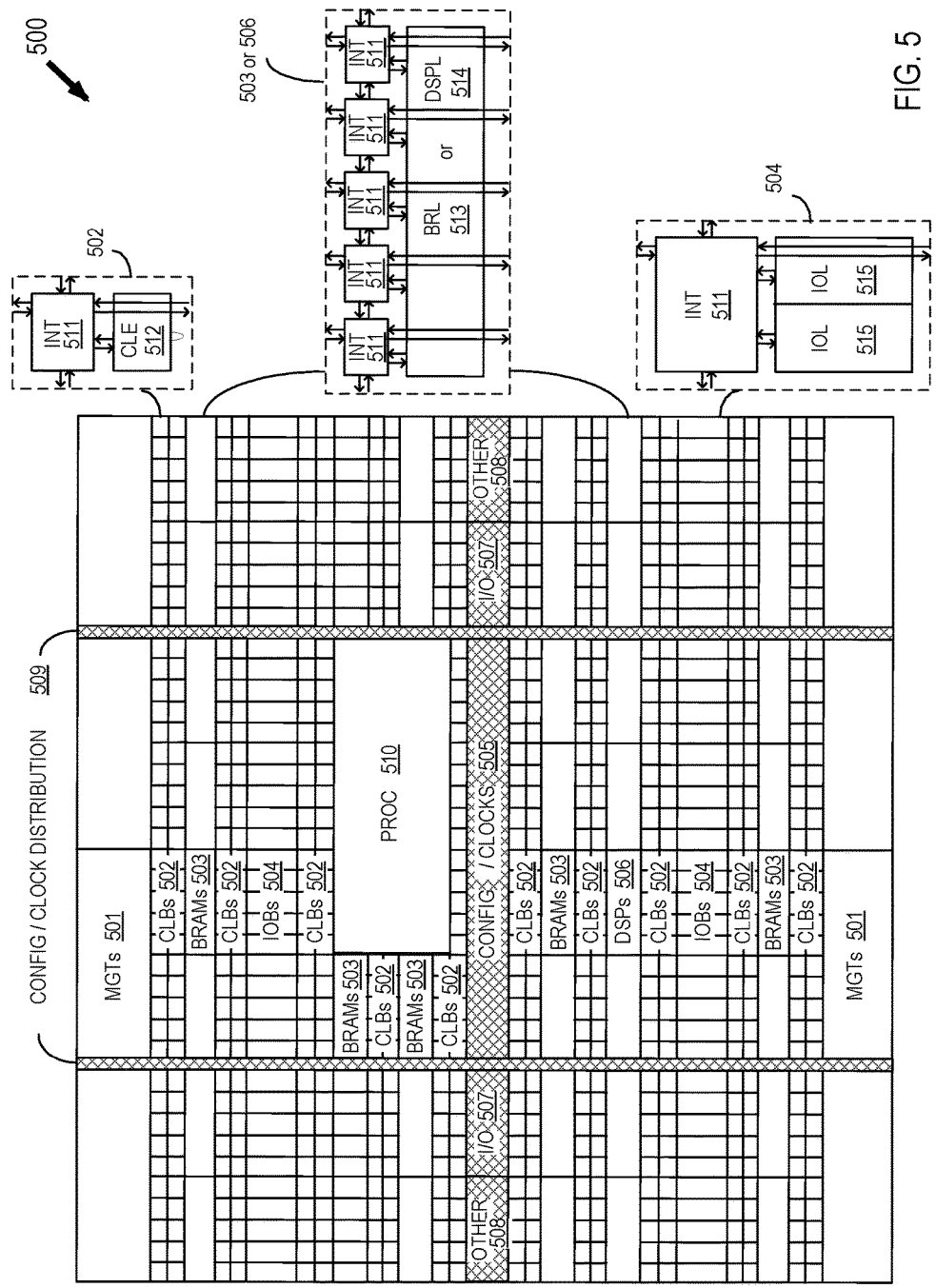
FIG. 5 shows a programmable integrated circuit (IC)

FIG. 5 shows a programmable integrated circuit (IC) 500. Circuit designs targeted to the exemplary programmable IC 500 and employing memory blocks of the programmable IC can be optimized for dynamic power consumption according to the disclosed approaches.

The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Figure 6:
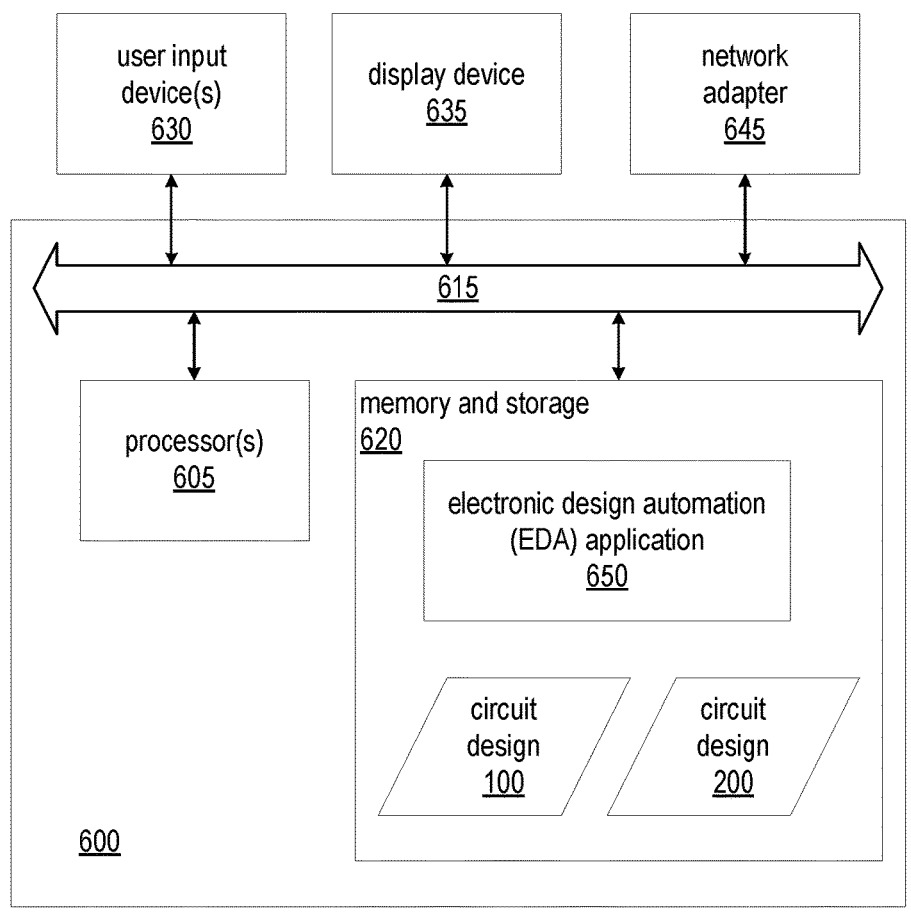
FIG. 6 is a block diagram illustrating an exemplary data processing system.

FIG. 6 is a block diagram illustrating an exemplary data processing system (system) 600. System 600 is an example of an EDA system. As pictured, system 600 includes at least one processor circuit (or "processor"), e.g., a central processing unit (CPU) 605 coupled to memory and storage arrangement 620 through a system bus 615 or other suitable circuitry. System 600 stores program code and circuit design 100 within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application 650. EDA application 650, being implemented in the form of executable program code, is executed by processor(s) 605. As such, EDA application 650 is considered part of system 600. System 600, while executing EDA application 650, receives and operates on circuit design 100. In one aspect, system 600 performs a design flow on circuit design 100, and the design flow may include synthesis, mapping, placement, routing, and the application of one or more dynamic power optimization techniques as described herein. System 600 generates an optimized, or modified, version of circuit design 100 as circuit design 200.

EDA application 650, circuit design 100, circuit design 200, and any data items used, generated, and/or operated upon by EDA application 650 are functional data structures that impart functionality when employed as part of system 600 or when such elements, including derivations and/or modifications thereof, are loaded into an IC, such as a programmable IC, causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for optimizing power in circuit designs. Other aspects and features will be apparent to those skilled in the art from consideration of the specification. It is intended that the specification and drawings be considered as examples only, with a true scope of the invention being indicated by the following claims.

What is claimed is:

1. A method of processing a circuit design, comprising:
determining by a programmed computer system from a representation of the circuit design in a memory of the computer system, a subset of addresses of a first RAM of the circuit design that are accessed more often than a frequency threshold;
determining whether or not a size of a portion of the first RAM referenced in the subset is less than a size threshold;
creating in the representation of the circuit design in the memory and in response to the size of the portion of the first RAM referenced by the addresses in the subset being less than the size threshold, a specification of a second RAM for the subset of addresses; and
creating in the representation of the circuit design in the memory and in response to the size of the portion of the first RAM referenced by the addresses in the subset being less than the size threshold, a specification of a decoder circuit that is configured to:
  enable the second RAM and disable the first RAM in response to an input address in the subset of addresses, and
  enable the first RAM and disable the second RAM in response to an input address other than addresses in the subset of addresses.

2. The method of claim 1, wherein the second RAM has a smaller address space than the first RAM.

3. The method of claim 1, further comprising:
  inputting data, for a plurality of sets of address signals in the circuit design, that specify for each set of address signals of the plurality of sets of address signals, changes in value of each signal in the set of address signals; and
  wherein the determining includes determining from the changes in values of the signals in the plurality of sets of address signals, addresses that are accessed more often than the frequency threshold.

4. The method of claim 1, further comprising:
  inputting data, for a plurality of sets of address signals in the circuit design, that specify for each set of address signals of the plurality of sets of address signals, respective toggle counts of the address signals of the plurality of sets of address signals; and
  wherein the determining includes:
    determining from the respective toggle counts, toggle rates and static probabilities of the address signals of the plurality of sets of address signals, and
    determining the addresses that are accessed more often than the frequency threshold based on the static probabilities of the address signals of the plurality of sets of address signals.

5. The method of claim 4, wherein the determining the addresses that are accessed more often than the frequency threshold based on the static probabilities of the address signals of the plurality of sets of address signals includes:
  assigning a bit value 1 to each address signal having a static probability greater than a first threshold,
  assigning a bit value 0 to each address signal having a static probability less than a second threshold, and
  marking a bit value as uncertain for each address signal having a static probability less than the first threshold and greater than the second threshold.

6. The method of claim 5, wherein the determining the addresses that are accessed more often than the frequency threshold based on the static probabilities of the address signals includes designating an address to be accessed more often than the frequency threshold in response to a set of address signals of the plurality of sets of address signals having each address signal assigned a bit value of 1 or a bit value of 0.

7. The method of claim 5, wherein the determining the addresses that are accessed more often than the frequency threshold based on the static probabilities of the address signals includes:
  determining, for a set of address signals having one or more address signals marked as having an uncertain bit value, a static probability of each possible combination of bit values of the one or more address signals, and
  selecting at least one combination of each possible combination based on the static probability of each possible combination.

8. The method of claim 5, wherein the determining the addresses that are accessed more often than the frequency threshold based on the static probabilities of the address signals includes:
  determining, for a set of address signals having one or more address signals marked as having an uncertain bit value, a static probability of each possible combination of bit values of the one or more address signals based on transition probabilities of transitions from each other possible combination of bit values of the one or more address signals to the possible combination, and
  selecting at least one combination of each possible combination based on the static probability of each possible combination.

9. The method of claim 1, wherein the determining includes performing structural analysis of a plurality of sets of address signals in the circuit design.

10. The method of claim 9, wherein the performing structural analysis includes identifying counters and finite state machines in the circuit design.

11. The method of claim 1, wherein the second RAM has a smaller address space than the first RAM and is implemented in one or more look-up tables of programmable logic circuitry.

12. A system for processing a circuit design, comprising:
  one or more processor circuits;
  a memory arrangement coupled to the one or more processor circuits, wherein the memory arrangement is configured with instructions that when executed by the one or more processor circuits cause the one or more processor circuits to:
    determine from a representation of the circuit design in the memory arrangement, a subset of addresses of a first RAM of the circuit design that are accessed more often than a frequency threshold;
    determine whether or not a size of a portion of the first RAM referenced by the addresses in the subset is less than a size threshold;
    create in the representation of the circuit design in the memory arrangement and in response to the size of the portion of the first RAM referenced by the addresses in the subset being less than the size threshold, a specification of a second RAM for the subset of addresses; and
    create in the representation of the circuit design in the memory arrangement and in response to the size of the portion of the first RAM referenced by the addresses in the subset being less than the size threshold, a specification of a decoder circuit that is configured to:
      enable the second RAM and disable the first RAM in response to an input address in the subset of addresses, and
      enable the first RAM and disable the second RAM in response to an input address other than addresses in the subset of addresses.

13. The system of claim 12, wherein the second RAM has a smaller address space than the first RAM.

14. The system of claim 12, wherein the memory arrangement is configured with further instructions that when executed by the one or more processor circuits cause the one or more processor circuits to:
  input data, for a plurality of sets of address signals in the circuit design, that specify for each set of address signals of the plurality of sets of address signals, changes in value of each signal in the set of address signals; and wherein the instructions that determine the subset of addresses include instructions that determine from the changes in values of the signals in the plurality of sets of address signals, addresses that are accessed more often than the frequency threshold.

15. The system of claim 12, wherein the memory arrangement is configured with further instructions that when executed by the one or more processor circuits cause the one or more processor circuits to:
  input data, for a plurality of sets of address signals in the circuit design, that specify for each set of address signals of the plurality of sets of address signals, respective toggle counts of the address signals of the plurality of sets of address signals; and
  wherein the instructions that determine the subset of addresses include instructions that when executed by the one or more processors cause the one or more processors to:
    determine from the respective toggle counts, toggle rates and static probabilities of the address signals of the plurality of sets of address signals, and
    determine the addresses that are accessed more often than the frequency threshold based on the static probabilities of the address signals of the plurality of sets of address signals.

* * * * *